United States Patent [19]
Pipkin et al.

[11] Patent Number: 5,481,714
[45] Date of Patent: Jan. 2, 1996

[54] METHOD AND SYSTEM FOR INSTALLING AN OPERATING SYSTEM ON A DATA PROCESSING SYSTEM WITH ABORT CAPABILITY AND VOICE INPUT FEATURE

[75] Inventors: Darryl Pipkin, Colleyville; Eddie Rogers, Carrollton; Linda Jones-Scott; Keith T. Scott, both of Keller, all of Tex.

[73] Assignee: International Business Machines Corporation, Armonk, N.Y.

[21] Appl. No.: 138,328

[22] Filed: Oct. 18, 1993

[51] Int. Cl.$^6$ .................................................. G06F 9/445
[52] U.S. Cl. .................................... 395/700; 364/DIG. 1; 364/280
[58] Field of Search ......................... 395/700, 650

[56] References Cited

U.S. PATENT DOCUMENTS

| 5,325,532 | 6/1994 | Crosswy et al. | 395/700 |
| 5,359,730 | 10/1994 | Marron | 395/650 |
| 5,361,358 | 11/1994 | Cox et al. | 395/700 |

OTHER PUBLICATIONS

IBM Technical Disclosure Bulletin TDB n1 Jun. 1991 p. 177, *Logging Status Inforamtion While Installing New Software.*

*Nynex Launches Voice Dialling Service*, Exchange, Feb. 12, 1993.

*Qualix's Sayit Puts Workstations Into Voice Control, Qualix Group: Debuts Sayit Software That Puts Workstation Into Voice Control*, Computer Reseller News, Oct. 5, 1992, p. 76.

IBM Technical Disclosure Bulletin TDB n5 Oct. 1990 pp. 76–77, *OS/2 Extended Edition Common Install Driver.*

Primary Examiner—Thomas M. Heckler
Attorney, Agent, or Firm—Geoffrey A. Mantooth

[57] ABSTRACT

An installation of a new operating system on a data processing system can be aborted, wherein an old operating system, which is already resident on the data processing system, can be reused. During the installation of the new operating system, temporary files of the new operating system are built on the data processing system, based on information provided by a user. This information may be provided by voice input. After building the temporary files, the user is given an opportunity to abort the installation. If the user elects to abort the installation, then the temporary files of the new operating system are deleted and use of the old operating system continues. If the user elects to continue with the installation, then the new operating system is installed onto the data processing system.

16 Claims, 2 Drawing Sheets

METHOD AND SYSTEM FOR INSTALLING AN OPERATING SYSTEM ON A DATA PROCESSING SYSTEM WITH ABORT CAPABILITY AND VOICE INPUT FEATURE

TECHNICAL FIELD OF THE INVENTION

The present invention relates to methods and systems for installing operating systems onto data processing systems.

BACKGROUND OF THE INVENTION

An operating system is computer software that is installed onto a data processing system such as a workstation or a computer. The operating system controls the execution of programs on the data processing system. In addition, the operating system typically provides services such as input/output control, data management and resource allocation.

Operating systems are frequently upgraded. In order to install a new version of an operating system, the user essentially replaces the old version that is resident on the user's workstation with the new version. With prior art installation methods, the installation of the new version of the operating system damages the old version of the operating system that exists on the data processing system. Thus, if the user wishes to abort the installation of the new operating system, the user is unable to do so.

Even if the installation of the new operating system could be aborted, the old operating system is unusable because of the damage it received during the installation of the new operating system. This would leave the data processing system without an operating system.

Another problem is that the installation of the operating system is typically a complex and difficult task. This is because operating systems are designed to be flexible and thus provide for many possible setup environments. During the installation of an operating system, the user is typically prompted to provide information that is used for the installation. For example, the user may be asked how the user wishes the hard disk drive on the workstation is to be configured. Such complexity makes it difficult for users to properly install an operating system.

SUMMARY OF THE INVENTION

It is an object of the present invention to provide a method and system that allows the installation of an operating system to be aborted or terminated.

It is another object of the present invention to provide a method and system that permits the reuse of an existing operating system on a data processing system after the installation of another operating system has been aborted.

It is another object of the present invention to provide a method and system that simplifies the installation of an operating system on a data processing system by allowing an installer to provide voice data input during installation.

The method and system of the present invention installs an operating system on a data processing system. Files of the operating system are built in the data processing system. It is determined if the installation of the operating system is to continue or to be aborted. If the installation of the operating system is to be aborted, then the files of the operating system are deleted. If the installation of the operating system is to continue, then the files of the operating system are permanently stored on the data processing system.

The method and system of the present invention allows a user to provide information for the installation of an operating system on a data processing system. This information determines, among other things, how the operating system is to be installed and what features of the operating system are to be installed. After the user provides the information, the installation of the operating system is begun. However, the initial installation is achieved without damaging the old operating system that already exists on the data processing system. After this initial installation step, the user is given an opportunity to abort the installation. For example, the user may have provided incorrect information. The installation can be aborted and the old operating system (which already exists on the data processing system) can be reused. Reinstallation of the new operating system can be attempted if desired, with different information being provided by the user.

The information can be provided by a variety of input devices, such as a keyboard, a touch screen, a mouse or a voice recognition system.

DESCRIPTION OF THE INVENTION

Figure 1:
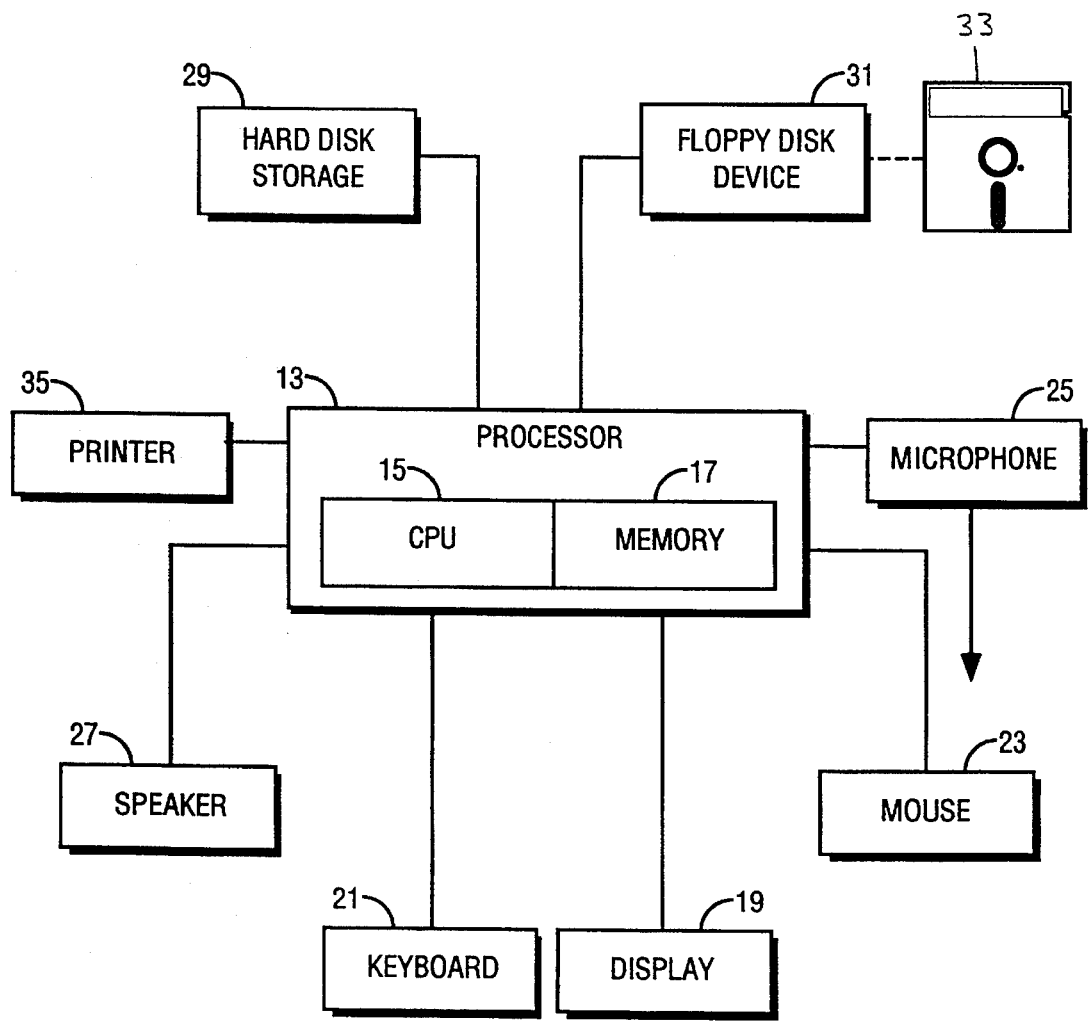
FIG. 1 is a schematic diagram of a data processing system upon which the present invention can be practiced.

In FIG. 1, there is shown a data processing system 11 upon which the present invention can be practiced. The system has a processor 13, which itself has a central processor unit 15 and memory 17, such as RAM and/or ROM, located therein. Peripheral devices are connected to the processor. A display unit 19, containing a display screen, is connected to the processor 13. Input devices, in the form of a keyboard 21, a mouse 23 and a microphone 25 are also connected to the processor 13. A speaker 27 is also provided. Memory devices in the form of a hard disk storage 29 and a floppy disk device 31, are connected to the processor 13. The floppy disk device 31 receives a floppy disk 33, which is a computer readable medium. The memory devices 29, 31 store objects such as application programs and data files, which objects may be periodically accessed by a user of the data processing system 11. There is also provided a printer 35 that is connected to the processor 13.

The data processing system 11 can be a stand alone system, or it may be part of a network that contains other data processing systems.

An operating system is installed on the data processing system 11. An example of an operating system is OS/2 (OS/2 is a trademark of International Business Machines Corporation). The operating system is typically located on either the hard disk storage 29 or on a floppy disk or disks 33. The operating system is computer software that controls the execution of programs on the data processing system 11, provides input/output control, provides data management, provides resource allocation and other services.

When the data processing system 11 is turned off, the operating system is typically contained on the hard disk storage 29. Turning on the data processing system 11 by providing electrical power causes the data processing system to boot up and copy the operating system from the hard disk storage 29 into memory 17. Alternatively, the operating system may be copied into the memory from the floppy disk 33 or disks.

Installation of a new operating system onto the data processing system 11 can be from one or more floppy disks 33 or via a network connected to the data processing system. The present invention retains the old operating system that is resident in the data processing system while the new operating system is copied onto the data processing system. Then, before the new operating system replaces the old operating system, the user is provided an opportunity to abort the installation of the new operating system. If the installation of the new operating system is aborted, then the old operating system is maintained and utilized on the data processing system. If the installation of the new operating system is continued, and not aborted, then the new operating system replaces the old operating system.

The present invention also allows a user to install an operating system using voice commands, in order to simplify the installation.

Figure 2:
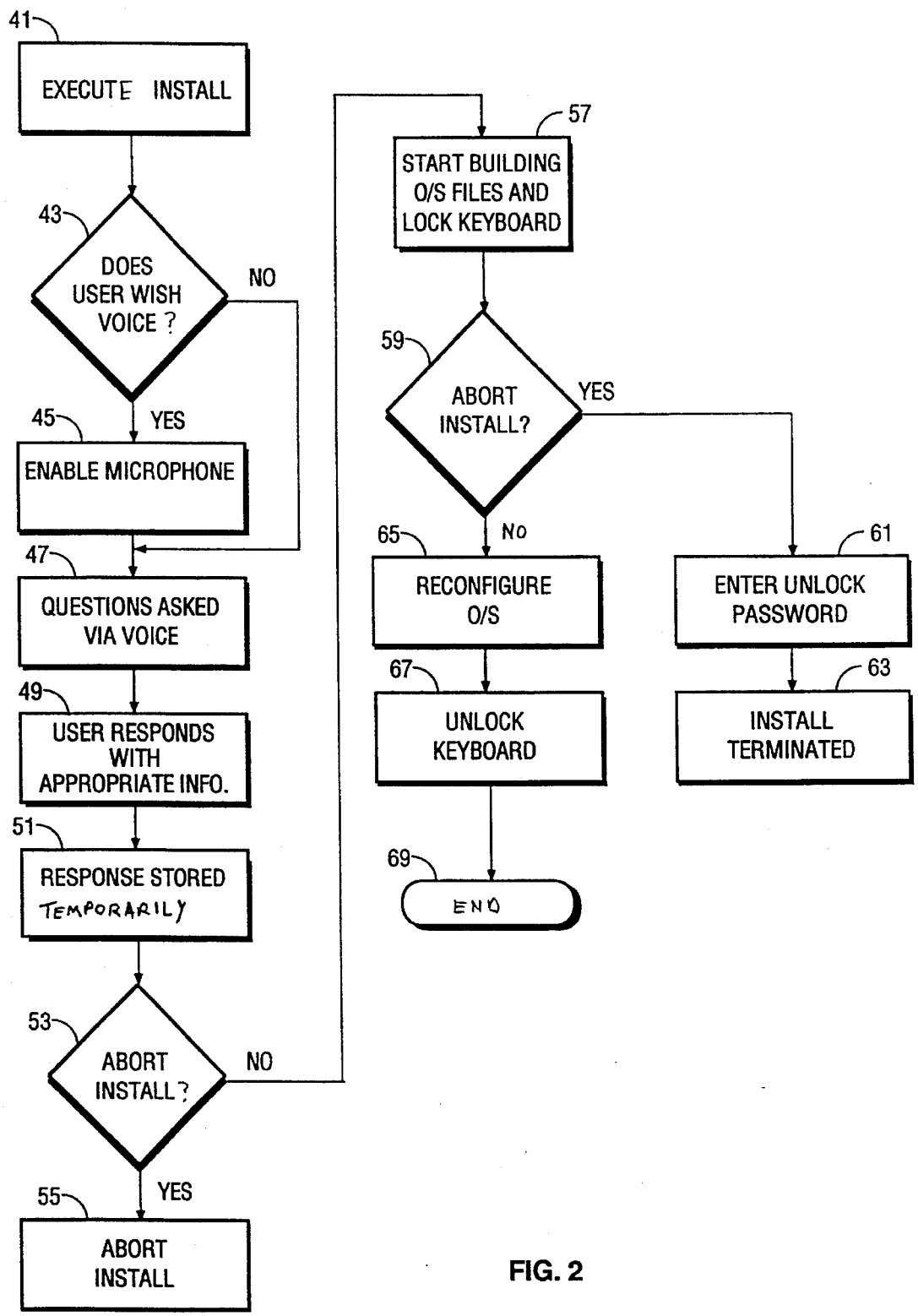
FIG. 2 is a flow chart of the method of the present invention, in accordance with a preferred embodiment.

Referring now to FIGS. 1 and 2, the installation method of the present invention will be described. In the flow chart of FIG. 2, the following graphical conventions are observed: a rectangle for a processor function and a diamond for a decision about a user input. These conventions are well understood by programmers skilled in the art of operating systems and user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages. (IBM and Personal System/2 are trademarks of International Business Machines Corporation.)

The installation method starts, step 41 of FIG. 2, when the method is invoked or executed by a user of the data processing system 11. Invocation can be, for example, by pressing a well known key (such as "F10") or by selecting an icon displayed on the display, which icon is representative of the installation method. In step 43, the method determines if the user wishes to respond to installation questions using voice inputs. This can be achieved by prompting the user, either through the speaker 27 or the display 19, and then waiting for a response from the keyboard 21 or the mouse 23. If the result of step 43 is YES, then in step 45, the microphone 25 is enabled. After step 45, the method proceeds to step 47. If the result of step 43 is NO, then step 45 is bypassed, and the method proceeds directly to step 47.

In step 47, installation questions are asked of the user via voice (by way of the speaker 27). In an alternate embodiment, the user can be prompted with installation questions that are presented on the display 19. In step 49, the user responds to the installation questions using an appropriate input device. For example, if the specified input device is the microphone 25, then the user can input voice responses. The voice responses are converted into electrical data signals with a voice recognition system. Voice recognition systems are well known in the art. Alternatively, the user can utilize the keyboard 21, the mouse 23 or by touching the display to input responses, or the user may utilize more than one input device. Touch display recognition systems are well known in the art.

The installation questions are asked in order to customize the installation of the operating system to the user's needs and to the data processing system 11. For example, the installation of an operating system sold by International Business Machines Corporation under the trademark OS/2 provides two types of installation methods. One type of installation is referred to as unattended or automated, while the other type of installation is referred to as attended or a la carte.

With the unattended type of installation, the user, after the appropriate prompts or installation questions have been provided, enters information such as: the base operating system which is to be installed (if plural versions are available); whether the user wishes the hard disk storage 29 to be formatted; the type of terminal emulation desired (if the data processing system 11 is connected to a mainframe computer); and whether a local area network (LAN) requester is to be installed. Other information is provided by the user, which information includes the user name and other user identification. During the unattended installation, many defaults are set. For example, a default printer driver is provided. After installation, step 69, the user can edit these default values by editing the files containing the default values. For example, if a LAN requester is installed, the user can edit the appropriate LAN requester file to specify the user's computer name and domain. If a communications manager is installed, the user can provide the appropriate name, gateway address and network name.

With the attended type of installation method, individual features of the operating system are installed one by one. Specific prompts or installation questions are provided to the user. The user name and other identifying information are requested by the data processing system and then entered by the user. Other information provided by the user includes: specifying the drive onto which the operating system is to be installed; formatting an installation partition; selection of a file system (either a high performance file system or a file allocation table file system); and selected features such as a print manager, a LAN manager and a communications manager. These latter features may require additional information from the user for proper installation.

In step 51, the information provided by the user is temporarily stored. Then, in step 53, the method determines if the user would like to abort the installation of the operating system. This is accomplished by prompting the user and waiting for a response by the user. At this step in the installation, the user is given an opportunity to abort the installation. Continuing with the installation process will tie up the data processing system 11 for some length of time. Step 53 allows the user to immediately reuse the data processing system for other tasks. If the result of step 53 is YES, then in step 55, the installation of the operating system is aborted. If the result of step 53 is NO, then the method proceeds to step 57.

In step 57, the method begins to build the new operating system files. The files are transferred from the source (for example a floppy disk) to the memory 17 (such as RAM) inside of the processor 13. The files, which include executable code, are built in a compressed format. Alternatively, the new operating system files can be built in a temporary space on the hard disk storage 29, or other storage device, instead of building the files in memory. In this alternative step, the new operating system files are built on the hard disk storage so as not to damage the files of the old operating system. In addition, in step 57, the keyboard (and other active input devices) is locked so as to prevent input activity from interfering with the building of the operating system files. Locking the keyboard can be accomplished by stealing or intercepting the interrupt from the keyboard and screening the data that is input. Data provided by the keyboard is thus blocked or ignored. However, specific commands, such as are described in steps 59, 61 and 67, are passed through.

In step 59, the method determines if the user wishes to abort the installation. This is accomplished by prompting the user and then waiting for a response by the user. The user may wish to abort the installation of the new operating system for a variety of reasons. For example, the user may wish to provide different information in step 49, or the user may wish to return to using the old operating system. If the result of step 59 is YES, then in step 61, the user enters an unlock password to unlock the keyboard (and other input devices). In step 63, the installation of the new operating system is terminated. All files that were built in step 57 are deleted from memory and continued use of the old operating system occurs.

If the result of step 59 is NO, the method proceeds to step 65. In step 65, the operating system of the data processing system 11 is reconfigured. The hard disk storage 29 is formatted, effectively deleting the old operating system. This is followed by loading the new operating system files onto the hard disk storage from memory. As the new operating system files are being loaded, they are decompressed or exploded. After reconfiguring, the new operating system becomes operable.

In step 67, the keyboard (or other locked input device) is unlocked so as to allow data or command entries by the user.

In step 69, the installation method ends.

The foregoing disclosure and the showings made in the drawings are merely illustrative of the principles of this invention and are not to be interpreted in a limiting sense.

What we claim is:

1. A computer implemented method for installing a new operating system on a data processing system, said data processing system having an old operating system located thereon, comprising the steps of:
    a) building files of said new operating system in said data processing system without damaging said old operating system;
    b) determining if the installation of said new operating system is either to continue or is to be aborted;
    c) if the installation of said new operating system is to be aborted, then deleting said files of said new operating system and utilizing said old operating system in subsequent operations of said data processing system; and
    d) if the installation of said new operating system is to continue, then permanently storing said files of said new operating system on said data processing system.

2. The method of claim 1, wherein said operating system contains options, further comprising the steps of:
    a) prompting a user of said data processing system for information regarding said options; and
    b) allowing said user to respond with voice sounds.

3. The method of claim 2, wherein said step of prompting a user of said data processing system for information regarding said options further comprises the step of using voice sounds to prompt said user.

4. The method of claim 1, wherein said step of permanently storing said files of said new operating system on said data processing system further comprises the step of deleting said old operating system.

5. The method of claim 1, wherein said data processing system comprises volatile data storage and nonvolatile data storage, wherein:
    a) said step of building files of said new operating system in said data processing system further comprises the step of storing said files of said new operating system in said volatile data storage; and
    b) said step of permanently storing said files of said new operating system on said data processing system further comprises the step of storing said files of said new operating system in said nonvolatile data storage.

6. The method of claim 1, wherein said data processing system comprises an input device, said step of building files of said new operating system in said data processing system further comprises the step of locking said input device during said step of building files of said new operating system in said data processing system so as to prevent the entry of data, but to allow the entry of information relating to aborting the installation.

7. The method of claim 1, wherein said operating system contains options, further comprising the steps of:
    a) prompting a user of said data processing system for information regarding said options; and
    b) allowing said user to choose the manner of responding, said manner of responding taken from the group consisting of voice sounds, touching a display, a mouse and a keyboard.

8. The method of claim 1, further comprising the step of accepting information regarding the installation of said operating system, before said files are built.

9. A system for installing a new operating system on a data processing system, said data processing system having an old operating system located thereon, comprising:
    a) means for building files of said new operating system in said data processing system without damaging said old operating system;
    b) means for determining if the installation of said new operating system is either to continue or is to be aborted;
    c) means for deleting said files of said new operating system if the installation of said new operating system is to be aborted and utilizing said old operating system; and
    d) means for permanently storing said files of said new operating system on said data processing system if the installation of said new operating system is to continue.

10. The system of claim 9, wherein said operating system contains options, further comprising:
    a) means for prompting a user of said data processing system for information regarding said options; and
    b) means for allowing said user to respond with voice sounds.

11. The system of claim 10, wherein said means for prompting a user of said data processing system for information regarding said options further comprises means for using voice sounds to prompt said user.

12. The system of claim 9, wherein said means for permanently storing said files of said new operating system on said data processing system further comprising means for deleting said old operating system.

13. The system of claim 9, wherein said data processing system comprises volatile data storage and nonvolatile data storage, wherein:
    a) said means for building files of said new for storing said files of said new operating system in said volatile data storage; and said new operating system on said data processing system further comprises means for storing said files of said new operating system in said nonvolatile data storage.

14. The system of claim 9, wherein said data processing system comprises an input device, said means for building files of said new operating system in said data processing system further comprises means for locking said input device during the building of files of said new operating system in said data processing system so as to prevent the entry of data, but to allow the entry of information relating to aborting the installation.

15. The system of claim 9, wherein said operating system contains options, further comprising:

a) means for prompting a user of said data processing system for information regarding said options; and b) means for allowing said user to choose the manner of responding, said manner of responding taken from the group consisting of voice sounds, touching a display, a mouse and a keyboard.

16. The system of claim 9, further comprising means for accepting information regarding the installation of said operating system, before said files are built.

* * * * *